US012615237B2

(12) United States Patent     (10) Patent No.:   US 12,615,237 B2

Whelton         (45) Date of Patent:   *Apr. 28, 2026

---

(54) SYSTEM AND METHOD FOR UTILIZATION OF FIREWALL POLICIES FOR NETWORK SECURITY

(71) Applicant: Level 3 Communications, LLC, Denver, CO (US)

(72) Inventor: Robert Whelton, Louisville, CO (US)

(73) Assignee: Level 3 Communications, LLC, Denver, CO (US)

( * ) Notice: Subject to any disclaimer, the term of this patent is extended or adjusted under 35 U.S.C. 154(b) by 17 days.

This patent is subject to a terminal disclaimer.

(21) Appl. No.: 18/886,335

(22) Filed: Sep. 16, 2024

(65) Prior Publication Data

US 2025/0047643 A1    Feb. 6, 2025

Related U.S. Application Data

(63) Continuation of application No. 17/991,322, filed on Nov. 21, 2022, now Pat. No. 12,095,735.

(60) Provisional application No. 63/283,038, filed on Nov. 24, 2021.

(51) Int. Cl.
    *H04L 9/40*        (2022.01)

(52) U.S. Cl.
    CPC ...... *H04L 63/0263* (2013.01); *H04L 63/0236* (2013.01)

(58) Field of Classification Search
    CPC ........................ H04L 63/0263; H04L 63/0236
    See application file for complete search history.

(56) References Cited

U.S. PATENT DOCUMENTS

| | | | | |
|---|---|---|---|---|
| 10,341,296 B2 * | 7/2019 | Bhagwat | ................ | H04L 63/02 |
| 2008/0279109 A1 * | 11/2008 | Furman | ................ | H03M 13/09 |
| | | | | 370/242 |
| 2010/0325429 A1 | 12/2010 | Saha | | |
| 2017/0041294 A1 * | 2/2017 | Tulasi | ................ | H04L 63/1425 |
| 2018/0167363 A1 * | 6/2018 | Jain | .................... | H04L 63/0218 |
| 2018/0351818 A1 | 12/2018 | Mohanram | | |
| 2019/0342225 A1 | 11/2019 | Sanghi | | |
| 2020/0106745 A1 * | 4/2020 | Glazemakers | ........ | H04L 63/083 |
| 2020/0329054 A1 | 10/2020 | Bjarnason | | |
| 2023/0164118 A1 | 5/2023 | Whelton | | |

* cited by examiner

*Primary Examiner* — El Hadji M Sall

(57) ABSTRACT

Aspects of the present disclosure involve systems, methods, for encoding a firewall ruleset into one or more bit arrays for fast determination of processing of a received communication packet by a firewall device associated with a network. Through this bitmap, a number of computation operations needed to determine a processing rule for a received packet is significantly reduced compared to the traditional approach of using a hash or a longest prefix match technique. Rather, determining a processing rule for a received packet may include determining a bit value within one or more arrays. In one implementation, a firewall rule may be encoded into a 64-bit array of bit values in which each bit of the array corresponds to a particular processing rule for a particular network address. The firewall rule may be encoded into a bitmap array of bit values by asserting a particular bit within the array.

20 Claims, 7 Drawing Sheets

200

202   Receive Firewall Policy Rule

204   Encode Policy Rule Into Bitmap Array

206   Receive Packet To/From The Secondary Network For Processing

208   Obtain Policy Rule For Processing Received Packet From One Or More Bitmap Arrays 210   Process Received Packet Based On Encoded Policy Rule From The One Or More Bitmap Arrays 302 — Receive Address Associated With A Firewall Policy Rule 304 — Determine Bitmap Array For Firewall Policy Rule 306 — Set Bitmap Address As First 26 Bits Of Address 308 — Set Address Bit Value As The Nth Bit Of A 64-Bit Value Where N = Last 6 Bits Of Address 310 — Set The Nth Bit Of The Corresponding 64-Bit Bitmap Array At The Bitmap Address To One Network Address From Firewall Rule

[00100101].[11111111].[01010101].[11111111]

Bitmap Address       N Bit Address
                     = 9                    406

404       Bitmap Array       408

[00000000......0000000000000000000000100000000]

63                                        9       0

Array Bit Position

402

600

[XXXXXXXXX.....XXXXXXXXXXXXXXXXXXXX]  Blacklist Array       602

OR

[XXXXXXXXX.....XXXXXXXXXXXXXXXXXXXX]  Threatlist Array       604

AND

~[XXXXXXXXX.....XXXXXXXXXXXXXXXXXXXX]  Whitelist Array       606

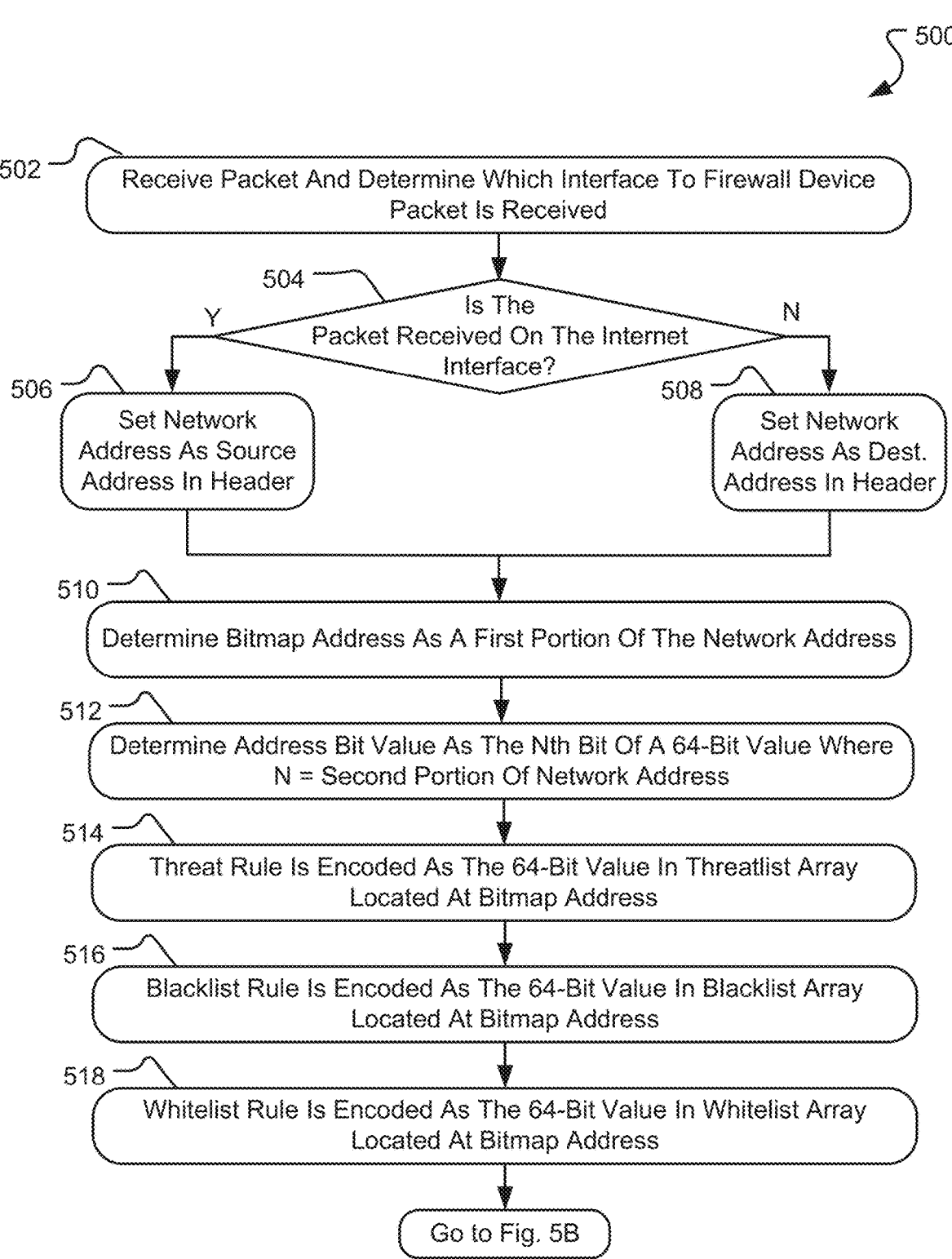

500

502   Receive Packet And Determine Which Interface To Firewall Device Packet Is Received 504   Is The Packet Received On The Internet Interface?

Y        N

506   Set Network Address As Source Address In Header

508   Set Network Address As Dest. Address In Header

510   Determine Bitmap Address As A First Portion Of The Network Address

512   Determine Address Bit Value As The Nth Bit Of A 64-Bit Value Where N = Second Portion Of Network Address 514   Threat Rule Is Encoded As The 64-Bit Value In Threatlist Array Located At Bitmap Address 516   Blacklist Rule Is Encoded As The 64-Bit Value In Blacklist Array Located At Bitmap Address 518   Whitelist Rule Is Encoded As The 64-Bit Value In Whitelist Array Located At Bitmap Address Go to Fig. 5B

FIG. 5A

SYSTEM AND METHOD FOR UTILIZATION OF FIREWALL POLICIES FOR NETWORK SECURITY

TECHNICAL FIELD

Embodiments of the present invention generally relate to systems and methods for implementing a communications network, and more specifically for network firewall devices and policies associated with such firewall devices.

BACKGROUND

Providing secure communications between devices is an important component of many communication networks. Many communication network configurations therefore include one or more services to provide security to the network devices and/or devices utilizing the network to communicate. For example, a backbone or service network may offer a firewall service to customers that is configured to control or monitor incoming and outgoing traffic to/from a customer network or network device. Firewall devices are typically dispersed at entry points into/out of a network such that potentially harmful or malicious communications can be detected and, in some instances, discarded or blocked by the firewall. The purpose of a firewall is to act as a defense against malicious and unauthorized traffic from affecting a customer or secondary network, keeping the information that an organization does not want out, while allowing approved information to flow into and out of the network. Other security devices, systems, and/or services may respond to other threats such as denial-of-service attacks, phishing schemes to obtain sensitive information, malware distribution in or on the network, and the like. Through the collection of security procedures and devices, a network may be situated to respond to attacks and protect the communications within and transmitted through/from the network.

Generally speaking, firewall services maintain a list of network addresses and an associated rule for processing packets received from or intended for the corresponding network address. For example, a firewall service may receive a communication packet intended for a secondary network and obtain a source network address from the packet. The service uses the source network address to search a firewall policy to obtain a processing rule for packets from the source address. Processing the packet may include dropping the packet, rerouting the packet, scrubbing the packet, allowing the packet to enter the secondary network, and the like. As some network addressing schemes may include billions of possible network addresses, significant transmission time may be spent in searching a firewall's entire ruleset to identify the processing rule to apply to a received packet, slowing the transmission speed of the packet into the secondary network. Techniques have been developed to improve the ruleset look-up procedure, such as through the use of hashing or longest prefix matching with a tree structure. However, these techniques still require the firewall service to execute several computations to obtain the processing rule for a received communication packet.

It is with these observations in mind, among other, that aspects of the present disclosure were conceived.

SUMMARY

One aspect of the present disclosure relates to a method for providing a firewall service. The method may include the operations of encoding a firewall ruleset into one or more arrays comprising a string of bits, wherein each bit of the one or more arrays corresponds to one processing rule of the firewall ruleset and obtaining, utilizing a first portion of a network address included in a received communication packet, the one or more arrays from a data structure. The method may also include the operations of determining a bit value from the one or more arrays based on a second portion of the network address and processing the received communication packet based on the bit value from the one or more arrays.

Another aspect of the present disclosure relates to a network firewall device comprising a processing device, at least one interface receiving communication packets, and a non-transitory computer-readable medium encoded with instructions. When the instructions are executed, the processing device may perform the operations of encoding a firewall ruleset into one or more arrays comprising a string of bits, wherein each bit of the one or more arrays corresponds to one processing rule of the firewall ruleset and obtaining, utilizing a first portion of a network address included in a communication packet received via the at least one interface, the one or more arrays from a data structure. The processing device may also perform the operations of determining a bit value from the one or more arrays based on a second portion of the network address and processing the received communication packet based on the bit value from the one or more arrays.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however, the emphasis instead is being placed on illustrating the principles of the technological concepts. The drawings depict only typical embodiments of the present disclosure and, therefore, are not to be considered limiting in scope.

FIGS. 5A and 5B illustrates a flowchart of a method for utilizing a bitmap of a firewall rule for processing a communication packet into or out of a secondary network in accordance with one embodiment.

DETAILED DESCRIPTION

Figure 1:
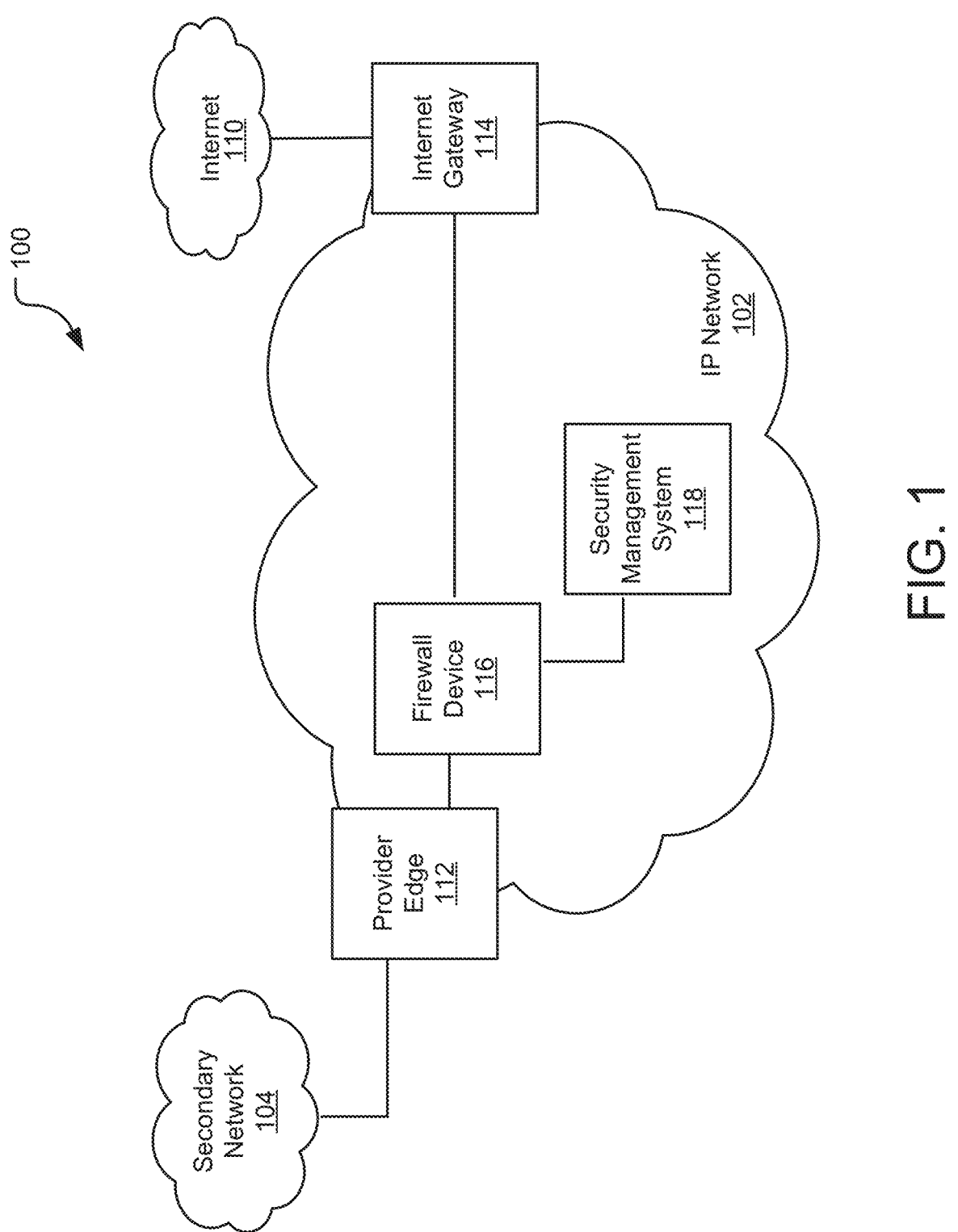
FIG. 1 schematic diagram illustrating an exemplary network operating environment in accordance with one embodiment.

Aspects of the present disclosure involve systems, methods, and the like, for encoding a firewall ruleset into one or more bit arrays, also referred to herein as a "bitmap", for fast determination of processing of a received communication packet by a firewall device associated with a network. Through the bitmap encoding, all 4 billion Internet Protocol version 4 (IPv4) addresses may be mapped to a single bit within a 500 Megabyte (MB) data structure, with each bit in the data structure corresponding to a binary "drop" or "pass" rule for a received packet associated with an IP address. Through this bitmap, a number of computation operations needed to determine a processing rule for a received packet is significantly reduced compared to the traditional approach of using a hash or a longest prefix match technique. Rather, determining a processing rule for a received packet may include determining a bit value within one or more arrays of bits that indicates a processing rule for the received packet.

In one particular implementation, a firewall rule may be encoded into a 64-bit array of bit values (or bitmap) in which each bit of the array is a one value or a zero value that corresponds to a particular processing rule for a particular network address. For example, a firewall rule may indicate that packets from a particular source address be blocked from entering a secondary network. The firewall rule may be encoded into a bitmap array of bit values by asserting a particular bit within the array. In one particular implementation, the bitmap array may be indexed through a bitmap address that comprises a first portion of the source network address. For example, the first 26 bits of the source address may be used as a bitmap address (or indexing address at which a particular bitmap array is stored). The remaining portion of the source address may indicate a bit position within the bitmap array that is asserted in response to the firewall rule. For example, the remaining 6 bits of the source address may provide a bit position within the bitmap array at which a bit may be asserted or de-asserted corresponding the firewall rule to encode the rule in the bitmap array.

In some instances, the firewall service may maintain different bitmap arrays that correspond to different firewall rules. For example, a blacklist bitmap array may store encoded firewall rules for addresses from which communications are blocked, a whitelist bitmap array may store encoded firewall rules for addresses from which communications are allowed to pass, and a threat bitmap array may store encoded firewall rules for addresses for which communications may be noted as a potential threat and further processing of the communication may be performed. Each of the different arrays may store the encoded firewall rules through the assertion or de-assertion of a bit within the respective arrays based on the type of rule. More or fewer bitmap arrays corresponding to other types of processing rules may also be maintained by the firewall device.

Upon receipt of a communication either intended for a secondary network or received from the secondary network, the firewall device may utilize either the source or destination IP address of the received communication to access one or more of the bitmap arrays storing the encoded firewall rules to determine a bit value within the one or more arrays. The bit values from the bitmap arrays may indicate a processing rule for the received communication. In this manner, determining a firewall rule for processing the received communication may be one or more bitwise operations, executed with fewer operations and faster than a traditional firewall rule lookup, such as using hashing values or longest prefix matching with a trie tree structure. As such, a firewall device may process received communications at a faster rate, significantly reducing the latency of communication packet transmission introduced by traditional firewall device.

Beginning at FIG. 1, an exemplary operating environment 100 for providing security services, such as a firewall security service, to one or more secondary networks 108 is illustrated. In general, the environment 100 provides for establishing communication sessions between network users or customers and for providing one or more network services to such network users over a backbone network, illustrated as IP network 102. For example, customers may utilize the network 102 to communicate using communication devices, such as telephone devices and/or mobile communication devices. In another example, content from a content delivery network (CDN) may be provided to and/or from one or more customers of the network 102 through the operating environment 100 discussed herein. In still another example, the network environment 100 may facilitate communications between networks managed or administered by separate entities, such as communications between IP network 102 and secondary network 104. The IP network 102 may also provide access services to one or more customers, such as access to the Internet 110. With specific reference to FIG. 1, the environment 100 includes the IP network 102, which may be provided by a wholesale network service provider. However, while the environment 100 of FIG. 1 shows a configuration using the IP network 102, it should be appreciated that portions of the network may include non IP-based routing. For example, network 102 may include devices utilizing time division multiplexing (TDM) or plain old telephone service (POTS) switching. In general, the network 102 of FIG. 1 may include any communication network devices known or hereafter developed.

The IP network 102 includes numerous components such as, but not limited to gateways, routers, route reflectors, and registrars, which enable communication and/or provides services across the IP network 102, but are not shown or described in detail here because those skilled in the art will readily understand these components. Communications between the IP network 102 and other entities or networks, such as secondary network 104, may also be managed through network environment 100. In some instances, secondary network 104 may be a home network and can include personal communication devices such as, but not limited to, a personal computer or a telephone connected to a router/firewall. In other instances, secondary network 104 may include a larger-scale network, such as a virtual private network (VPN) or an enterprise network, which may connect to the network 102 in various geographic locations. In general, the secondary network 104 may include any type of communication device that receives a multimedia signal, such as an audio, video or web-based signal, and presents that signal for use by a user of the communication device. The communication and networking components of the secondary network 104 enable a user at the secondary network to communicate via the IP network 102 to other communication devices, such as another customer network, or receive services from the IP network, such as security services and/or access to the Internet 110. In some embodiments, multiple communication devices in diverse locations that are owned or operated by a particular entity or customer may be connected through the IP network 102.

Networks, such as the Internet 110 and secondary network 104, may connect to IP network 102 through one or more interface devices. Interface devices may include, but are not limited to, provider edge devices 112 and/or Internet gateway device 114. For ease of instruction, only two external networks 104, 110 are shown communicating with the IP network 102; however, numerous such networks, and other devices, may be connected with the network, which is equipped to handle enormous numbers of simultaneous calls and/or other IP-based communications. As discussed, the IP network 102 may provide one or more telecommunication or other network services to the secondary network 104. For example, an operator of secondary network 104 may purchase, and the IP network 102 may provide, one or more security services for protection of the communications provided to and transmitted from the secondary network. Such security services may be provided via the provider edge 112 of the network 102 or any other device of the network, as explained in more detail below.

In one particular example, the IP network 102 may provide a firewall service to the secondary network 104 from one or more firewall devices 116. In general, the firewall service provides gatekeeping functions for communications into or out of the secondary network 104. In one example, the firewall service may be included in the provider edge device 112 of the IP network 102 that receives communications associated with the secondary network 104. In another example, the firewall service may be implemented by a firewall device 116 or firewall server of the IP network 102. The firewall service may block, re-route, deny, flag, etc. communications entering or leaving the secondary network 104 based on a set of firewall rules, also referred to as a firewall ruleset. Management and configuration of the firewall rules of the firewall service is discussed in more detail below, including encoding the firewall ruleset into one or more bitmap arrays in which each bit of the arrays corresponds to a rule of the ruleset.

The firewall device 116 may, in some instances, be a server device of the IP network 102 configured to provide the firewall services to communications associated with the secondary network 104. In other implementations, the firewall device 116 may be a virtual machine hosted on a plurality of computing devices of the network 102, such as a plurality of application servers in communication with or within the network. The firewall device 116 may include, in one implementation, three network interfaces comprising a management interface used to administer the device including configuration of the operating system (OS) of the device, an encoding and processing application running on the OS, and updating a threat feed and network data from upstream systems. The firewall device 116 may further include a private side interface (an interface facing the secondary network 104) that connects to a device of the secondary network, such as a router or other network device. An Internet side interface (an interface facing into IP network 102) may also be included that connects to a device associated with the Internet 110, i.e. a router that can be the gateway, default route, to the Internet as provided to the secondary network 104 without the firewall device being present. Further, although illustrated as connected to a single secondary network 104, the firewall device 116 may be connected to or otherwise associated with any number of devices, networks, etc. connected to the network 102 to firewall services to the devices and networks.

In one implementation, a security management system 118 may communicate with the IP network 102 and/or the secondary network 104 to manage the firewall device 116. Although shown as instantiated within the IP network 102, the security management system 118 may be separate from the IP network. In general, the security management system provides configurations and updates to the devices and services of the firewall device 116 in response to threat data or information to update the firewall ruleset encoded into the one or more bitmap arrays.

In general, the firewall device 116 may be deployed between the secondary network 104 and the gateway 114 to the Internet 110. In one implementation, the firewall device 116 is deployed using network layer 3 (IP) routing such that communications to and from the secondary network 104 are routed to the firewall device 116, regardless of how the device is physically connected within the network 102. In another implementation, the firewall device 116 may be physical connected between the secondary network 104 and the Internet 110 to process all communications between the secondary network and the Internet gateway 114. Those of ordinary skill in the art will appreciated the various ways in which the firewall device 116 may receive communications associated with the secondary network 104 for application of the firewall ruleset associated with the secondary network.

Figure 2:
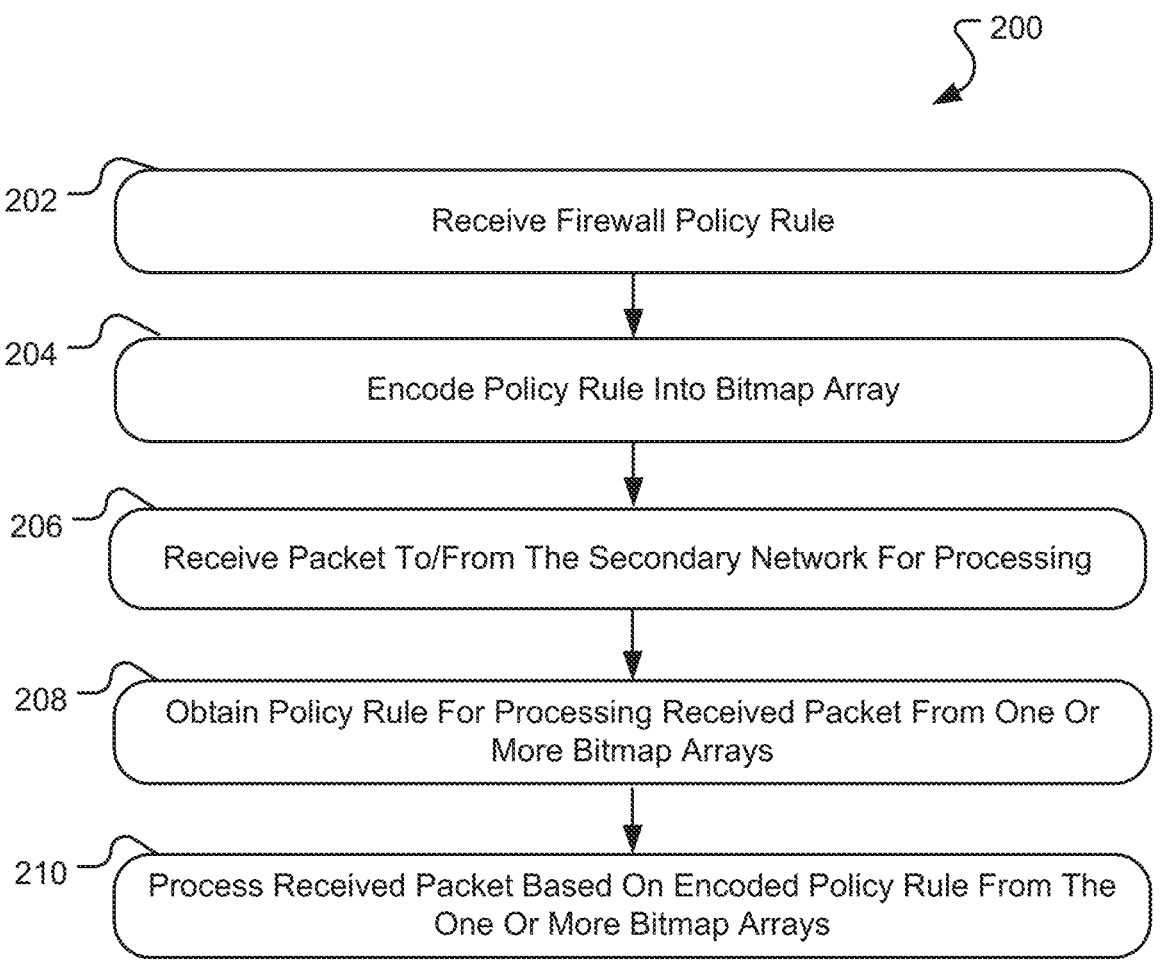
FIG. 2 illustrates a flowchart of a method for utilizing an encoded firewall rule for processing a communication packet in accordance with one embodiment.

FIG. 2 illustrates a flowchart of a method 200 for utilizing an encoded firewall rule for processing a communication packet in accordance with one embodiment. The operations of the method 200 may be executed by the security management system 118 and/or the firewall device 116 of network 102. Through the method 200, a firewall ruleset may be encoded into a data structure, referred to as a bitmap, that improves the processing of communications into or out of the secondary network 104 to which the firewall device 116 is associated.

Beginning at operation 202, one or more firewall policy rules may be received for inclusion in a firewall ruleset for enforcement by the firewall device 116. In general, the firewall rule includes a processing rule for a received communication, such as accept the communication packet, deny the communication packet, reroute the communication packet, mark the communication packet as a potential threat. As explained above, a firewall device 116 typically inspects or analyzes each packet that travels through it to decide if it should allow the packet to pass through the firewall based on a sequence of rules (or ruleset) pertaining to the values of the one or more fields in the packet. For example, a packet may include a source IP address and destination IP address. A firewall rule may utilize either the source IP address and/or the destination IP address values to determine whether the packet is allowed to pass through the firewall or is denied. As such, a decision portion of a firewall rule determines what happens if the value obtained from the communication packet matches to address value of the rule. The rule then typically employs an accept or deny action on the packet, with the possibility of additional actions, such as an instruction to log the action, mark the packet, re-route the packet, and the like.

As discussed above, a firewall policy is generally made up of an ordered list of these rules such that as a packet is processed by the firewall device 116, the firewall attempts to match some aspect of the packet to the rule one rule at a time, from beginning of the rule list to the end. Matching the packet means that the firewall evaluates a packet based on the fields in the rule tuple to determine if the fields match the values identified in each individual rule of the ruleset. A rule does not necessarily need to contain a value for all possible fields and can sometimes contain an "any" variable in a field to indicate that the rule is a "do not care" condition for that variable. In general, these rules are processed in order until the firewall device finds a match and takes the appropriate action identified by the decision portion of the rule.

The received firewall rule may therefore include a value, such as a source IP address or destination IP address, known as the tuple of the rule and a processing action for communications that match the tuple value. Although many processing actions may be included in the received firewall policy rule, the present disclosure discusses the processing actions of accept, deny, and mark as a potential threat. However, the operations and systems described herein may be applied to any type of processing rule included in any type of firewall rule supported by firewall device 116. For example, the firewall device 116 may be configured to route a received communication packet to a scrubbing environment of the network 102 based on a firewall policy rule. Other processing actions may also be undertaken by the firewall device 116.

In one particular implementation, the firewall policy rule may be received from a third-party source of firewall rule information. The third-party source may analyze Internet traffic data and identify possible sources of malicious or dangerous traffic, such as a source of frequent denial of service (DOS) attacks on a network, a common source of packets that contain a known virus, a common source of known spamming communications, and the like. In another implementation, network 102 may include a security threat analysis system to identify sources of potentially malicious data packets, which may or may not be the security management system 118. The third-party source or network threat analyzer may generate a firewall rule for identified sources of potentially malicious communication packets and provide the generated firewall rule to the firewall device 116. In another implementation, the security management system 118 may manage the distribution of firewall rules to one or more firewall devices of the network 102 such that the firewall rule to be encoded may be received from the security management system.

Figure 3:
FIG. 3 illustrates a flowchart of a method for encoding a firewall rule into a bitmap array in accordance with one embodiment.
Figure 3:
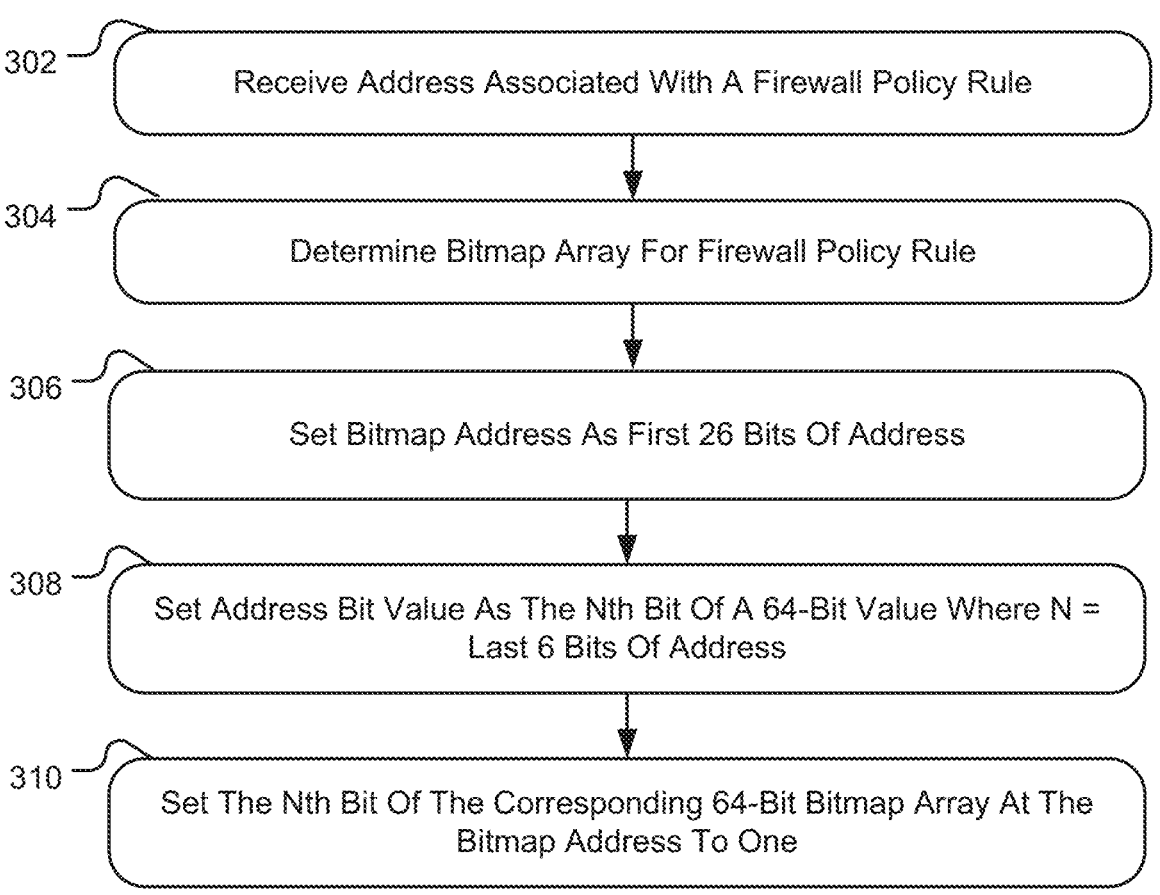

Regardless of the source of the firewall rule, the firewall device 116 or security management system 118 may, at operation 204, encode the policy rule into one or more bitmap arrays. FIG. 3 illustrates a flowchart of one method 300 for encoding a firewall rule into a bitmap array in accordance with one embodiment. In particular, an address associated with the firewall rule may be obtained at operation 302. As mentioned above, the firewall rule may include a tuple that, in some instances, may be a network address. The network address may be a source address. For example, a particular network address may be identified as a source of potentially malicious communication packets such that a firewall rule may identify the source address and a block action. In another example, the firewall rule may be configured to allow all traffic originating from the secondary network 104 to pass through the firewall device 116. As such, the firewall rule may include the source address as any address of devices of the secondary network 104 and an allow action. In a similar manner, the firewall rule may identify a destination address for one or more devices within the secondary network 104 for which all traffic may be blocked. In another example, a particular destination address of the Internet 110 may be identified as a device associated with a scam such that the firewall rule may identify the destination address and a block action. Any combination of source/destination addresses and processing action may be included in the firewall rule.

At operation 304, a bitmap array for the firewall policy rule may be determined. As described above, the firewall device 116 may maintain different bitmap arrays that correspond to different firewall processing actions. For example, a blacklist bitmap array may store encoded firewall rules for addresses from which communications are blocked, a whitelist bitmap array may store encoded firewall rules for addresses from which communications are allowed to pass, and a threat bitmap array may store encoded firewall rules for addresses for which communications may be noted as a potential threat and further processing of the communication may be performed. Thus, depending on the type of firewall rule being encoded (block, allow, mark as a threat, etc.), a bitmap array corresponding to that processing action may be determined. For example, for a received firewall rule that includes a block action, a blacklist bitmap array may be determined as the type of bitmap array for the received firewall rule. Similarly, a whitelist bitmap array may be determined for a received firewall rule that includes an allow processing rule. Other types of bitmap arrays may be maintained by the firewall device 116 for other types of processing actions included in one or more firewall rules.

Figures 4, 6:
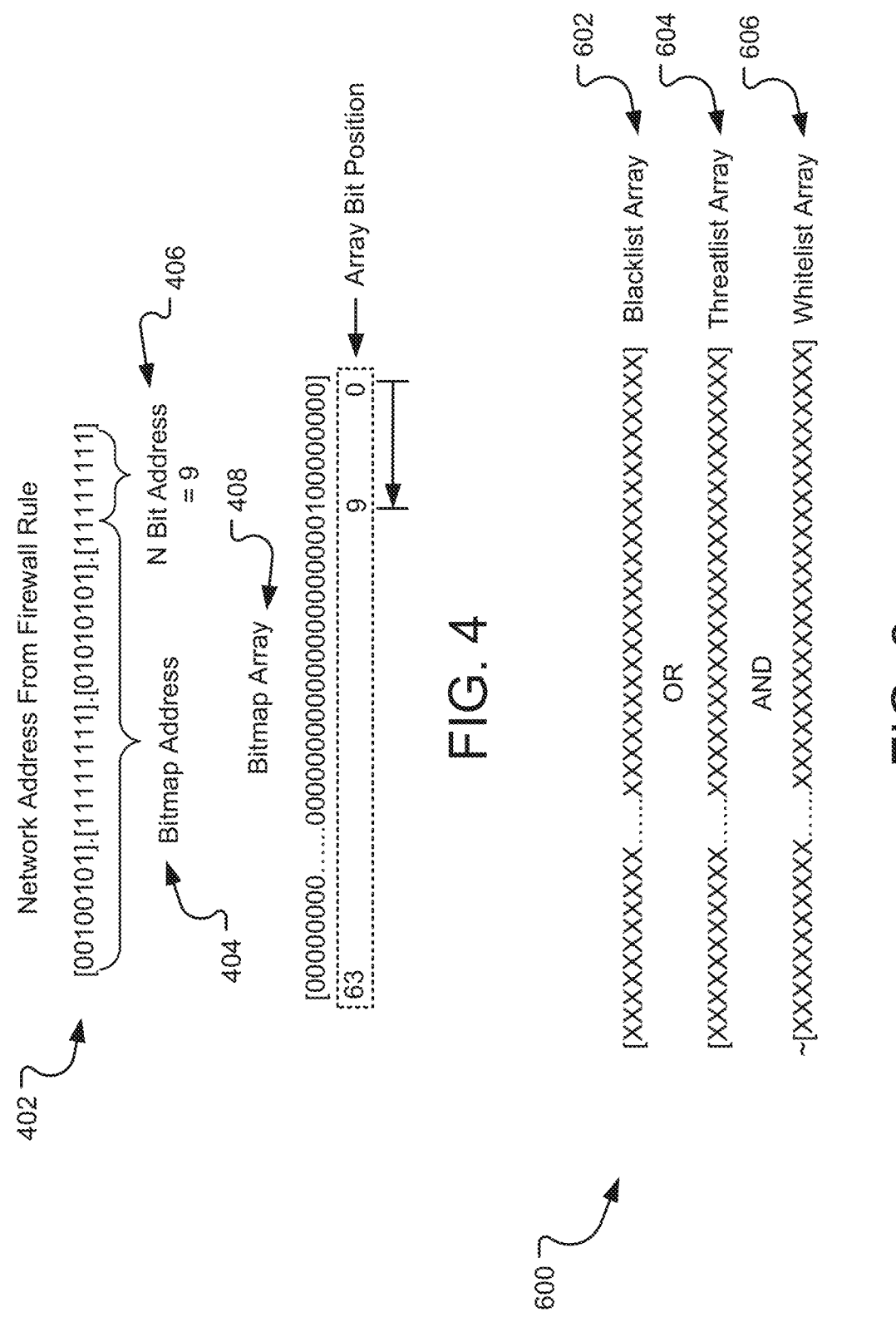
FIG. 4 is a diagram illustrating encoding a firewall rule into a bitmap array in accordance with one embodiment.
FIG. 6 is a diagram illustrating a logic equation for utilizing various bitmap arrays to process a received communication packet in accordance with one embodiment.

At operation 306, a bitmap address may be determined from the network address included in the received firewall rule. In one particular implementation, the bitmap address may correspond to the first 26 bits of the address included in the received firewall rule. Generally, an IP address comprises a 32-bit string of binary values. FIG. 4 is a diagram illustrating an example of an IP address included in a firewall rule that may be used to encode a firewall rule into a bitmap array in accordance with one embodiment. As mentioned above, the address value 402 in the firewall rule may be a source address or a destination address. Regardless, a portion of the address 402 included in the firewall rule may be obtained and used to determine a bitmap address at which a bitmap array is stored. In the illustrated example, the first 26 bits of the address 402 identified in the firewall rule is used as the bitmap address 404 for the particular bitmap array. For example, the firewall rule may include a tuple value of a network address 402 of: [00100101].[11111111].[01010101].[11111111]. This address 402 may correspond to a source address or a destination address, as identified in the firewall rule. From a portion of this address 402, a bitmap address 404 may be identified. In one example, the first 26 bits of the network address 402 in the firewall rule may be identified as the bitmap address 404, comprising the bit string [01111111110101010111111111]. This bitmap address value 404 may correspond to an address location within the bitmap data structure of the firewall device 116 at which the determined bitmap array to be updated with the received firewall rule may be stored. For example, at address location [01111111110101010111111111] of the firewall device 116 data structure, one or more bitmap arrays may be stored corresponding to different firewall policy actions, such as a blacklist array, a whitelist array, a threatlist array, and the like. In this manner, a particular bitmap array within the firewall device 116 data structure may be identified through the address 402 included in the received firewall rule. The identified bitmap array may then be updated to encode the received firewall rule into the determined bitmap array, as explained below. Further, although discussed herein as setting the first 26 bits of the IP address of the firewall rule as the bitmap address, the bitmap may include any number of bits from the network address, either contiguous or noncontiguous, as the bitmap address used to access a bitmap array from the data structure.

At operation 308, an address bit within the identified bitmap array may be identified from a second portion of the address identified in the received firewall rule. In one particular implementation, the address bit value may be the Nth bit within the identified bitmap array, where N is a bit position indicated by the last 6 digits of the network address in the firewall rule. Returning to the illustration of FIG. 4, a second portion of the network address 402 comprising a number of bits may be set as the address bit 406 for the identified bitmap array stored at and obtained from the data structure at the bitmap address 404. In the illustrated example, the bit address 406 corresponds to the last six bits of the network address 402, or the remaining portion of the network address after the bitmap address 404 is determined. In general, however, the bit address may be any number of bits from the network address, either contiguous or noncontiguous.

The bit address 406 generally indicates a bit position within the identified bit array. For example and as described above, a type of bit array may be identified corresponding to a processing action of the received firewall rule, such as a blacklist array, whitelist array, etc. A particular bitmap array may be accessed in the data structure at the bitmap address 404 (determined from the first portion of the network address included in the firewall rule). To determine which bit in the identified bitmap array to assert, the bit address 406 may be obtained from a second portion of the network address 402. In the example shown, the bit address 406 comprises six bits such that the corresponding bitmap array may be 64 bits long (as the six bits of the bit address can provide up to 64 different bit locations within the array). The second portion of the network address 402 illustrated in FIG. 4 is the bit string [001001], or a value of 9. Thus, in this example, N=9 such that the bit address or position within the identified bitmap array to be asserted to encode the received firewall rule is bit position 9. The bit address 406 may identify any bit position within the bitmap array, such as any position 0-63 for 64-bit array. Bit addresses comprising a smaller portion of the network address 402 may be utilized for smaller arrays and bit addresses comprising a larger portion of the network address may be utilized for longer arrays.

At operation 310, the received firewall rule may be encoded into the identified bitmap array by asserting a bit within the array corresponding to the bit address 406 value obtained from the network address 402. For example, a bitmap array 408 may be identified from a firewall rule (such as a blacklist array) and accessed at bitmap address 404 obtained from the first portion of the network address 402. To encode the firewall rule, the bit address 406 may be obtained from the second portion of the network address and a value of the second portion may be determined. In the example shown, the second portion equals "9", such that the bit address or position within the bitmap array 408 to be asserted is the ninth bit position. Asserting the Nth bit within the bitmap array 408 encodes the firewall rule into the data structure. In an alternate embodiment, the bitmap array 408 may comprise a series of one values and encoding the firewall rule includes de-asserting the bit at the Nth bit position to a zero value. Regardless, the bitmap array 408, after updated to include the encoded firewall rule, may be stored in the data structure. Additional firewall rules may be encoded in a similar manner such that the data structure stores an encoding of each firewall rule of the ruleset associated with the firewall device.

The firewall device 116 may utilize the encoded firewall ruleset to process communications associated with the secondary network 104. For example and returning to the method 200 of FIG. 2, a communication packet may be received at the firewall device 116 at operation 206. The communication may be received from a device of the secondary network 104 for transmission to a device of the Internet 110 or may be received from a device of the Internet intended for a device of the secondary network. Based on a source or destination address included in the received communication, the firewall device 116 may obtain an encoded firewall rule for processing the received packet at operation 208. More particularly, the firewall device 116 may utilize a portion of the bits of the network address included in the receive communication to identify a storage location within the data structure at which one or more bitmap arrays may be stored. In one example, the firewall device 116 may extract or otherwise determine the first 26 bits of the network address to determine the bitmap address value. One or more bitmap arrays may be accessed from the data structure using the bitmap address. Further, a processing action may be determined from a bit within the one or more bitmap arrays, such as a blocking action from a blacklist array, an allow action from a whitelist array, a marking action from a threatlist array, and the like. The bit within a particular bitmap array that determines a processing action by the firewall device 116 may be determined from a second portion of the network address in the received communication. In particular, the second portion may provide a bit position value within a bitmap array. An asserted bit at the determined bit position within the bitmap array may instruct the firewall device 116 on a processing action for the received communication. Based on the encoded rules stored in the one or more bitmap arrays, the firewall device 116 may process the received communication at operation 210 through a processing action, such as a deny action, allow action, re-route action, etc. In this manner, each rule of a firewall ruleset may be encoded as a single bit value within a data structure such that determining the processing action for a received communication may occur quickly by the firewall device 116, reducing a latency at the device for processing the communication.

Figure 5B:
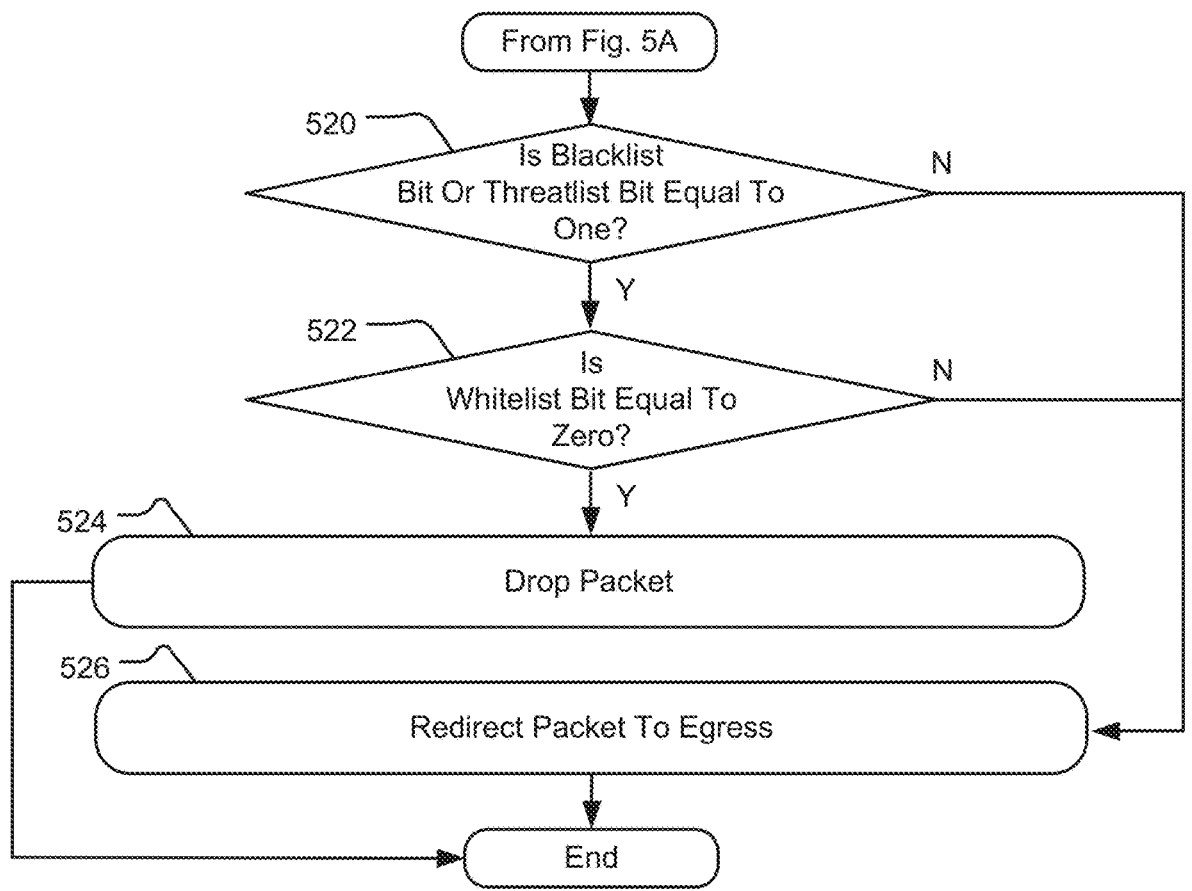

FIGS. 5A and 5B illustrates a flowchart of a more detailed method 500 for utilizing a bitmap of a firewall rule for processing a communication packet into or out of a secondary network 104 in accordance with one embodiment. The operations of the method 500 may be performed by the firewall device 116 (or any other component of the network 102) to process a received communication based on a ruleset encoded into the bitmap or data structure through the methods described above. The operations may reduce determining an applicable firewall rule to a received communication packet to bitwise computations, increasing the processing speed of the received communication by the firewall device 116.

At operation 502, the firewall device 116 may receive a communication packet associated with a secondary network 104. In the implementation in which the firewall device 116 provides firewall services to multiple secondary networks or devices, the firewall device may determine a secondary network or device for which the communication is associated. For example, each communication may include a header that comprises a source network address and a destination network address. These addresses may be IP networks addresses, although other network address standards are also contemplated. The firewall device 116 may include a database of addresses associated with any secondary network or device receiving a firewall service from the firewall device. Upon receiving a communication, the firewall device 116 may compare the source address and/or the destination address to the databases of addresses to determine which secondary network or device is associated with the received communication (either as a sender of the packet or a receiver of the packet). The firewall device 116 may further determine which interface the packet is received. For example, the firewall device 116 may include an Internet/ network communication port or interface that faces the IP network 102 and the Internet 110 to receive communications from and send communications to the Internet. The firewall device 116 may include another port or interface that faces the secondary network 104 to receive communications from and send communications to the secondary network. Thus, the firewall device 116 may determine through which interface the communication is received.

If the communication packet is received on the Internet interface as determined at operation 504, the firewall device 116 may set the network address as the source address included in the header of the packet at operation 506. Because the communication packet is received on the Internet interface, the source address included in the header indicates the Internet device that initiated transmission of the communication to the secondary network 104. If the communication packet is not received on the Internet interface, the firewall device 116 may set the network address as the destination address included in the header of the packet at operation 508. Communication packets received on the secondary network 104 interface are intended to be transmitted to a device of the network 102 or the Internet 110 such that the destination address in the header of the packet may be set as the network address for analysis by the firewall device 116. In the example illustrated in FIG. 4, the set network address is network address 402 used to determine a corresponding firewall rule for the received communication.

At operation 510, the firewall device 116 may set the bitmap address as a first portion of the network address determined above. As described above, the bitmap address may be the first 26 bits of the network address, although any portion of the network address may be set as the bitmap address. For a firewall device 116 that services multiple secondary networks or devices, the firewall device may determine a corresponding data structure of encoded firewall rules to apply to a received communication. For example, the firewall device 116 may store multiple data structures of encoded firewall rules, indexed by an identifier of a secondary network 104 or device for which the firewall ruleset applies. Thus, the firewall device 116 may identify a particular data structure of an encoded firewall ruleset for application to a given received communication.

In a similar manner, the firewall device 116 may, at operation 512, determine an address bit value as a second portion of the network address. In one particular example, the address bit value may correspond to the last six bits of the network address, although any sized portion of the network address may be used as the bit value. The bit value provides a bit position within one or more bit arrays to which a firewall rule may be encoded, as described above.

The firewall device 116 may access or obtain one or more stored bitmap arrays from a data structure using the bitmap address determined above. For example, the first 26 bits of the network address may provide a 26-bit address within the data structure at which one or more bitmap arrays are stored. The bitmap arrays may correspond to different communication packet processing actions, such as a blacklist array, a whitelist array, and a threatlist array. Thus, at operation 514, the firewall device 116 may access a threatlist array at the bitmap address. The threatlist array may, in one implementation, be a 64-bit array that stores encoded firewall rules for identifying a received communication as a potential threat. To determine if the particular received communication should be processed as a potential threat, the firewall device 116 may determine a bit position within the threatlist array corresponding to the address bit value determined above. In another implementation, the threatlist array may encode firewall rules provided by a threat feed provider as a list of known threats for blocking. In a similar manner, at operation 516, the firewall device 116 may also access a blacklist array at the bitmap address. The blacklist array may, in one implementation, be a 64-bit array that stores encoded firewall rules for identifying a received communication that is to be blocked or denied. In some implementations, the blacklist may be provided by the customer of the system to specify additional addresses or addresses to be blocked. A whitelist array may, at operation 518, be accessed at the bitmap address. The whitelist array may, in one implementation, be a 64-bit array that stores encoded firewall rules for identifying a received communication that is to be allowed to be transmitted to the destination address. Additional or fewer bitmap arrays may be stored or otherwise accessed through the bitmap address for other communication packet processing actions.

In FIG. 5B, the firewall device 116 may determine, at operation 520, if the Nth bit in the blacklist array or the Nth bit in the threatlist array is asserted. An asserted bit in either of the threatlist array or the blacklist array may indicate a "deny" processing action for the received communication. However, if the Nth bit in either the threatlist or the blacklist is un-asserted, the firewall device 116 may redirect the communication packet to an egress port at operation 526. Sending the packet to the egress port of the firewall device 116 prepares packet to be transmitted to the destination address or network as indicated by the destination address. Further, even if the Nth bit in the blacklist array or the Nth bit in the threatlist array is asserted, the firewall device 116 may include a rule to automatically let all communications from a particular address to pass, as encoded into the whitelist array. Thus, the firewall device 116 may determine, at operation 522, if the Nth bit in whitelist bitmap array is un-asserted. If the Nth bit of the whitelist bitmap array is un-asserted, the firewall device 116 may drop or deny the communication packet at operation 524 as a communication packet that is potentially malicious. If instead the Nth bit of the whitelist bitmap array is asserted, the firewall device 116 may redirect the communication packet to the egress port at operation 526 for transmission to the destination device indicated by the destination address in the packet header.

FIG. 6 is a diagram illustrating a logic equation for utilizing various bitmap arrays to process a received communication packet in accordance with one embodiment. The logic equation 600 is a bitwise operation of some of the operations of the method 500 discussed above with reference to FIGS. 5A and 5B. The firewall device 116 may execute the bitwise logic equation 600 to determine a processing action for a received communication packet, such as part of operations 520-526 discussed above with reference to method 500. The logic equation 600 of FIG. 6 may include a bitwise OR operation of a blacklist array 602 with a threatlist array 604. This operation may generate an array in which each bit of the array is asserted if a bit in the same position in either the blacklist array 602 or the threatlist array 604 is asserted. The resultant array may then be bitwise AND operation with an inverted whitelist array 606 to generate a combined array for determining the processing action of a received communication. The AND operation may generate an array in which each bit of the array is asserted only if a bit in the same position in both the resultant array from the OR operation and the inverted whitelist array is asserted. The firewall device 116 may use the array resulting from the bitwise operations 600 to determine a processing operation for a received communication packet. For example, the firewall device 116 may determine if the Nth bit in the array generated from the bitwise operations 600 of FIG. 6 is asserted. If the Nth bit is asserted, the firewall device 116 may block or deny the communication packet. In this manner, the bitmap arrays may be combined through one or more bitwise operations such that the firewall device 116 may determine the Nth bit of a single array comprising the combination of the various bitmap arrays at the bitmap address of the data structure. Through the combination of the bitmap arrays using the bitwise operations, a time for determining a processing action for a given communication packet may be further reduced to a single bit lookup in the combined array of the various bitmap arrays of the data structure.

Although discussed above with reference to a deny or accept processing action, it should be appreciated that other processing actions may be encoded into a bitmap array. For example, the threatlist array may correspond to a re-direct processing action for which, if the Nth bit of the threatlist array is asserted, the firewall device 116 may re-direct a received communication packet to a pre-designated device or destination. For example, an asserted bit within the threatlist array may correspond to re-directing a received communication to a scrubbing device or environment of the network 102. In another example, the threatlist array may correspond to setting a bit or bits within the header of the communication that indicates the communication is suspect. The secondary network 104 may process the received communication differently based on the set bit or bits within the header. In this manner, any number of bitmap arrays may be stored in the data structure of the firewall device 116 with encoded firewall rules each corresponding to a type of processing of a received communication packet.

Figure 7:
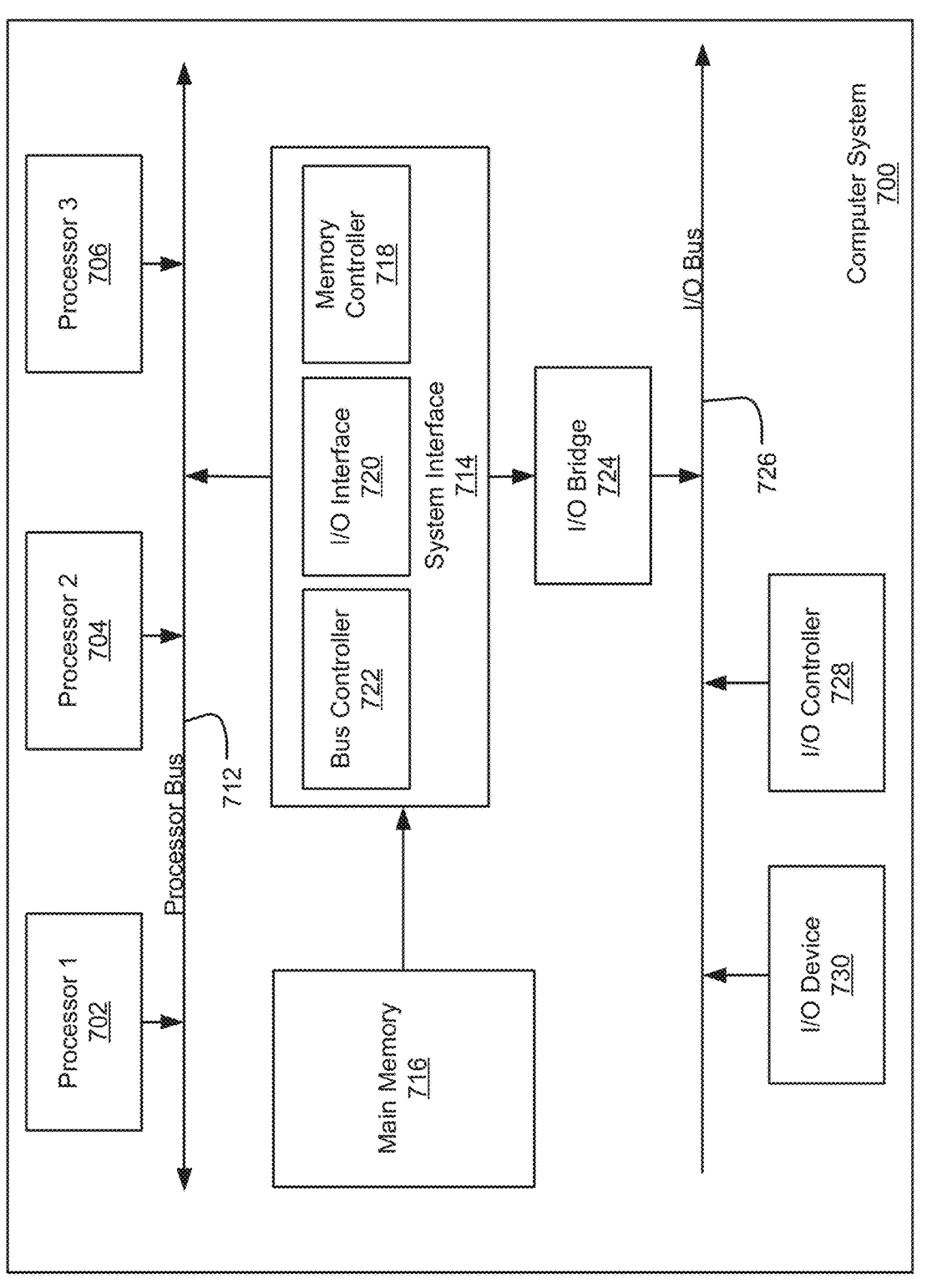
FIG. 7 is a diagram illustrating an example of a computing system which may be used in implementing embodiments of the present disclosure.

FIG. 7 is a block diagram illustrating an example of a computing device or computer system 700 which may be used in implementing the embodiments of the components of the network disclosed above. For example, the computing system 700 of FIG. 7 may be the security management system 118 or the firewall device 116 discussed above. The computer system (system) includes one or more processors 702-706. Processors 702-706 may include one or more internal levels of cache (not shown) and a bus controller or bus interface unit to direct interaction with the processor bus 712. Processor bus 712, also known as the host bus or the front side bus, may be used to couple the processors 702-706 with the system interface 714. System interface 714 may be connected to the processor bus 712 to interface other components of the system 700 with the processor bus 712. For example, system interface 714 may include a memory controller 718 for interfacing a main memory 716 with the processor bus 712. The main memory 716 typically includes one or more memory cards and a control circuit (not shown). System interface 714 may also include an input/output (I/O) interface 720 to interface one or more I/O bridges or I/O devices with the processor bus 712. One or more I/O controllers and/or I/O devices may be connected to the I/O bus 726, such as I/O controller 728 and I/O device 730, as illustrated.

I/O device 730 may also include an input device (not shown), such as an alphanumeric input device, including alphanumeric and other keys for communicating information and/or command selections to the processors 702-706. Another type of user input device includes cursor control, such as a mouse, a trackball, or cursor direction keys for communicating direction information and command selections to the processors 702-706 and for controlling cursor movement on the display device.

System 700 may include a dynamic storage device, referred to as main memory 716, or a random access memory (RAM) or other computer-readable devices coupled to the processor bus 712 for storing information and instructions to be executed by the processors 702-706. Main memory 716 also may be used for storing temporary variables or other intermediate information during execution of instructions by the processors 702-706. System 700 may include a read only memory (ROM) and/or other static storage device coupled to the processor bus 712 for storing static information and instructions for the processors 702-706. The system set forth in FIG. 7 is but one possible example of a computer system that may employ or be configured in accordance with aspects of the present disclosure.

According to one embodiment, the above techniques may be performed by computer system 700 in response to processor 704 executing one or more sequences of one or more instructions contained in main memory 716. These instructions may be read into main memory 716 from another machine-readable medium, such as a storage device. Execution of the sequences of instructions contained in main memory 716 may cause processors 702-706 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 816, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

I claim:

1. A method for providing a firewall service, the method comprising:

encoding a firewall ruleset into one or more arrays comprising a string of bits, wherein each bit of the one or more arrays corresponds to one processing rule of the firewall ruleset;

determining a bit value from the one or more arrays based on a first portion of a network address included in a received communication packet; and processing the received communication packet based on the bit value from the one or more arrays.

2. The method of claim 1 wherein encoding the firewall ruleset comprises: determining a first type of processing rule for a first rule of the firewall ruleset; and accessing, at an address of a data structure corresponding to a second portion of a network address included in the first rule, a first array of bits corresponding to the first type of processing rule.

3. The method of claim 2 wherein the network address is an Internet Protocol (IP) address and the first portion comprises a first twenty-six bits of the network address.

4. The method of claim 2 wherein the first type of processing rule is at least one of a deny processing action, an allow processing action, or a re-routing processing action.

5. The method of claim 2 wherein the one or more arrays are obtained from a data structure, wherein the data structure comprises a plurality of arrays stored at an address corresponding to the first portion of the network address, each of the plurality of arrays corresponding to a different communication packet processing action.

6. The method of claim 2 wherein encoding the firewall ruleset further comprises: asserting a bit of the first array of bits at a first bit position, the first bit position corresponding to a value equal to a second portion of the network address.

7. The method of claim 6 wherein the second portion comprises a last six bits of the network address.

8. The method of claim 1, further comprising:

determining, based on the network address including the received communication packet, an identifier of a receiving network; and selecting a data structure from a plurality of data structures as corresponding to the identifier of the receiving network.

9. The method of claim 1 wherein the first array of bits comprises 64 bits.

10. The method of claim 1 wherein processing the received communication packet comprises blocking the received communication to a destination address if the bit value from the one or more arrays is asserted.

11. The method of claim 1 wherein processing the received communication packet comprises transmitting the received communication to a destination address if the bit value from the one or more arrays is asserted.

12. A network firewall device comprising:

a processing device;

at least one interface receiving communication packets; and a non-transitory computer-readable medium encoded with instructions, when executed by the processing device, cause the processing device to perform the operations of:

encoding a firewall ruleset into one or more arrays comprising a string of bits, wherein each bit of the one or more arrays corresponds to one processing rule of the firewall ruleset;

determining a bit value from the one or more arrays based on a first portion of a network address included in a received communication packet; and processing the received communication packet based on the bit value from the one or more arrays.

13. The network firewall device of claim 12 wherein encoding the firewall ruleset comprises:

determining a first type of processing rule for a first rule of the firewall ruleset; and accessing, at an address of a data structure corresponding to a second portion of a network address included in the first rule, a first array of bits corresponding to the first type of processing rule.

14. The network firewall device of claim 13 wherein the network address is an Internet Protocol (IP) address and the second portion comprises a first twenty-six bits of the network address.

15. The network firewall device of claim 13 wherein the first type of processing rule is at least one of a deny processing action, an allow processing action, or a re-routing processing action.

16. The network firewall device of claim 13 wherein the one or more arrays are obtained at a data structure, wherein the data structure comprises a plurality of arrays stored at an address corresponding to the first portion of the network address, each of the plurality of arrays corresponding to a different communication packet processing action.

17. The network firewall device of claim 13 wherein encoding the firewall ruleset further comprises: asserting a bit of the first array of bits at a first bit position, the first bit position corresponding to a value equal to a second portion of the network address.

18. The network firewall device of claim 17 wherein the second portion comprises a last six bits of the network address.

19. The network firewall device of claim 12 wherein the instructions, when executed by the processing device, further cause the processing device to perform the operations of:

determining, based on the network address including the received communication packet, an identifier of a receiving network; and selecting the data structure from a plurality of data structures as corresponding to the identifier of the receiving network.

20. The network firewall device of claim 19 wherein the first array of bits comprises 64 bits.

* * * * *